US011887521B2

(12) United States Patent
Yang

(10) Patent No.: US 11,887,521 B2
(45) Date of Patent: Jan. 30, 2024

(54) PIXEL CIRCUIT AND DISPLAY DEVICE INCLUDING THE SAME

(71) Applicant: Samsung Display Co., Ltd., Yongin-si (KR)

(72) Inventor: Gunwoo Yang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/859,397

(22) Filed: Jul. 7, 2022

(65) Prior Publication Data

US 2023/0122487 A1 Apr. 20, 2023

(30) Foreign Application Priority Data

Oct. 15, 2021 (KR) ........................ 10-2021-0137459

(51) Int. Cl.
*G09G 3/20* (2006.01)

(52) U.S. Cl.
CPC ....... *G09G 3/20* (2013.01); *G09G 2300/0426* (2013.01); *G09G 2300/0819* (2013.01); *G09G 2300/0842* (2013.01); *G09G 2310/08* (2013.01); *G09G 2320/0247* (2013.01); *G09G 2320/0252* (2013.01)

(58) Field of Classification Search
CPC ......... G09G 3/3233; G09G 2300/0819; G09G 3/3283
See application file for complete search history.

(56) References Cited

U.S. PATENT DOCUMENTS

2013/0002616 A1* 1/2013 Kim .................... H01L 27/1214 345/204
2016/0104424 A1* 4/2016 Lim ..................... G09G 3/3233 345/76
2021/0027696 A1* 1/2021 Kim ......................... G09G 3/32
2021/0134917 A1* 5/2021 Li ........................ G09G 3/3275

FOREIGN PATENT DOCUMENTS

KR 1020210013509 A 2/2021

* cited by examiner

*Primary Examiner* — Van N Chow
(74) *Attorney, Agent, or Firm* — CANTOR COLBURN LLP

(57) ABSTRACT

A pixel circuit may include a light-emitting element, a driving transistor which applies a driving current to the light-emitting element, a storage capacitor connected to a control electrode of the driving transistor, a data voltage-applying transistor which applies a data voltage to the storage capacitor, an emission transistor which connects the driving transistor to the light-emitting element in response to an emission signal, and a bias capacitor disposed between a first electrode of the driving transistor and a control electrode of the emission transistor.

22 Claims, 9 Drawing Sheets

PIXEL CIRCUIT AND DISPLAY DEVICE INCLUDING THE SAME

This application claims priority to Korean Patent Application No. 10-2021-0137459, filed on Oct. 15, 2021, and all the benefits accruing therefrom under 35 U.S.C. § 119, the content of which in its entirety is herein incorporated by reference.

BACKGROUND

1. Field

Embodiments of the invention relate to a pixel circuit and a display device. More particularly, embodiments of the invention relate to a display device varying a driving frequency of a display panel.

2. Description of the Related Art

Generally, a display device may include a display panel, a driving controller, a gate driver, and a data driver. The display panel may include a plurality of gate lines, a plurality of data lines, and a plurality of pixels electrically connected to the gate lines and the data lines. The gate driver may provide gate signals to the gate lines, respectively. The data driver may provide data voltages to the data lines, respectively. The driving controller may control the gate driver and the data driver.

A display device that varies a driving frequency of the display panel may vary the driving frequency of the display panel by increasing or decreasing a vertical blank period within a frame.

SUMMARY

Since a driving time of one frame is increased when a driving frame is decreased, characteristics of a driving transistor included in a pixel circuit of a display panel may be fixed to a constant state during one frame, and it may cause a flicker on the display panel due to a hysteresis characteristics.

Embodiments of the invention provide a pixel circuit that prevents a flicker on a display panel due to a hysteresis characteristic caused by fixing a characteristic of a driving transistor in the constant state by performing a bias operation on a first electrode of the driving transistor in a self-scan period.

Embodiments of the invention also provide a display device providing a high-quality image to a user by including the pixel circuit.

In an embodiment of the invention, a pixel circuit includes a light-emitting element, a driving transistor which applies a driving current to the light-emitting element, a storage capacitor connected to a control electrode of the driving transistor, a data voltage which applies a data voltage to the storage capacitor, an emission transistor which connects the driving transistor to the light-emitting element in response to an emission signal, and a bias capacitor disposed between a first electrode of the driving transistor and a control electrode of the emission transistor.

In an embodiment, the emission transistor may be a P-type transistor.

In an embodiment, the pixel circuit may further include an light-emitting element initialization transistor which applies a first initialization voltage to an anode electrode of the light-emitting element.

In an embodiment, the light-emitting element initialization transistor may apply the first initialization voltage to the anode electrode of the light-emitting element in response to the emission signal, the light-emitting element initialization transistor may be an N-type transistor, and the emission transistor may be a P-type transistor.

In an embodiment, the pixel circuit may further include a data initialization transistor which applies a second initialization voltage to the control electrode of the driving transistor.

In an embodiment, the pixel circuit may further include a threshold voltage compensation transistor disposed between the control electrode of the driving transistor and the first electrode of the driving transistor.

In an embodiment, the pixel circuit may further include a reference voltage-applying transistor which applies a reference voltage to the storage capacitor.

In an embodiment, the driving transistor may include a second electrode which receives a driving power voltage, and the reference voltage may be identical to the driving power voltage.

In an embodiment, the pixel circuit may further include a threshold voltage compensation transistor disposed between the control electrode of the driving transistor and the first electrode of the driving transistor, and a control signal applied to a control electrode of the reference voltage-applying transistor may be identical to a control signal applied to a control electrode of the threshold voltage compensation transistor.

In an embodiment of the invention, a pixel circuit includes a light-emitting element, a driving transistor which applies a driving current to the light-emitting element, a storage capacitor connected to a control electrode of the driving transistor, a data voltage which applies a data voltage to the storage capacitor, an emission transistor which connects the driving transistor to the light-emitting element in response to an emission signal, and a bias capacitor includes a first electrode which receives a bias signal and a second electrode connected to a first electrode of the driving transistor.

In an embodiment, the emission transistor may be a P-type transistor.

In an embodiment, the bias signal may rise from a low voltage level to a high voltage level while the emission signal has the high voltage level.

In an embodiment, the pixel circuit may further include an light-emitting element initialization transistor which applies a first initialization voltage to an anode electrode of the light-emitting element.

In an embodiment, the light-emitting element initialization transistor may apply the first initialization voltage to the anode electrode of the light-emitting element in response to the bias signal, the light-emitting element initialization transistor may be an N-type transistor, and the emission transistor may be a P-type transistor.

In an embodiment, the pixel circuit may further include a data initialization transistor which applies a second initialization voltage to the control electrode of the driving transistor.

In an embodiment, the pixel circuit may further include a threshold voltage compensation transistor disposed between the control electrode of the driving transistor and the first electrode of the driving transistor.

In an embodiment, the pixel circuit may further include a reference voltage-applying transistor which applies a reference voltage to the storage capacitor.

In an embodiment, the driving transistor may include a second electrode which receives a driving power voltage, and the reference voltage may be identical to the driving power voltage.

In an embodiment, the pixel circuit may further include a threshold voltage compensation transistor disposed between the control electrode of the driving transistor and the first electrode of the driving transistor, and a control signal applied to a control electrode of the reference voltage-applying transistor may be identical to a control signal applied to a control electrode of the threshold voltage compensation transistor.

In an embodiment of the invention, a display device includes a display panel including pixels, a gate driver providing a gate signal to the pixels, a data driver providing a data voltage to the pixels, an emission driver providing an emission signal to the pixels, and a driving controller which controls the gate driver, the data driver, and the emission driver. Each of the pixels includes a light-emitting element, a driving transistor which applies a driving current to the light-emitting element, a storage capacitor connected to a control electrode of the driving transistor, a data voltage which applies a data voltage to the storage capacitor, an emission transistor which connects the driving transistor to the light-emitting element in response to an emission signal, and a bias capacitor connected to a first electrode of the driving transistor.

In an embodiment, the bias capacitor may include a first electrode connected to a control electrode of the emission transistor and a second electrode connected to the first electrode of the driving transistor.

In an embodiment, the bias capacitor may include a first electrode which receives a bias signal and a second electrode connected to the first electrode of the driving transistor.

Therefore, the pixel circuit may perform a bias operation on a first electrode of a driving transistor in a self-scan period by including a light-emitting element, the driving transistor which applies a driving current to the light-emitting element, a storage capacitor connected to a control electrode of the driving transistor, a data voltage which applies a data voltage to the storage capacitor, an emission transistor which connects the driving transistor to the light-emitting element in response to an emission signal, and a bias capacitor disposed between a first electrode of the driving transistor and a control electrode of the emission transistor.

In addition, the pixel circuit may perform a bias operation on a first electrode of a driving transistor in a self-scan period by including a light-emitting element, the driving transistor which applies a driving current to the light-emitting element, a storage capacitor connected to a control electrode of the driving transistor, a data voltage which applies a data voltage to the storage capacitor, an emission transistor which connects the driving transistor to the light-emitting element in response to an emission signal, and a bias capacitor includes a first electrode which receives a bias signal and a second electrode connected to a first electrode of the driving transistor. Accordingly, the pixel circuit may prevent a flicker on a display panel due to a hysteresis characteristic caused by fixing a characteristic of the driving transistor to a constant state.

Further, the display device may provide a high-quality image to a user by including the pixel circuit.

However, the effects of the invention are not limited to the above-described effects, and may be variously expanded without departing from the spirit and scope of the invention.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
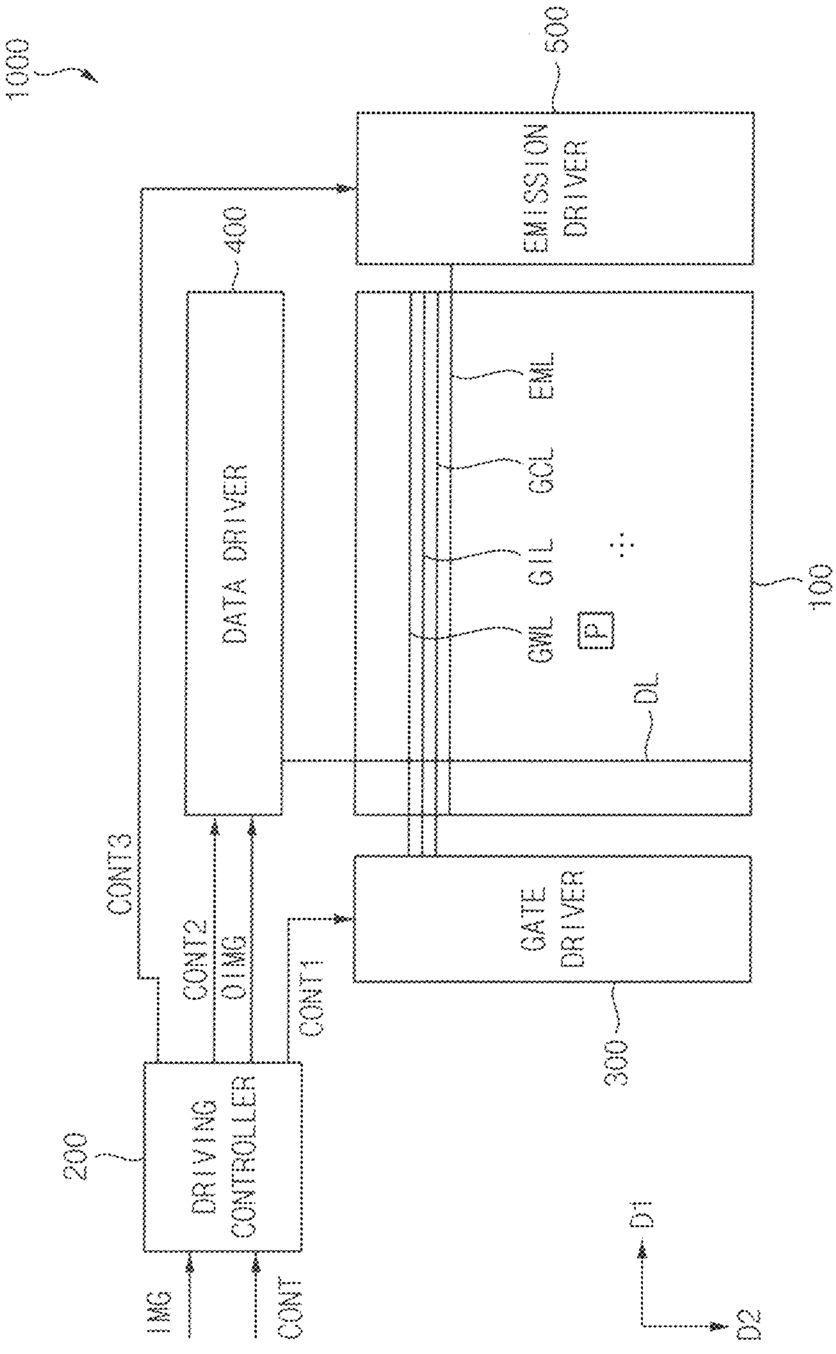
FIG. 1 is a block diagram illustrating an embodiment of a display device according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. In an embodiment, when the device in one of the figures is turned over, elements described as being on the “lower” side of other elements would then be oriented on “upper” sides of the other elements. The exemplary term “lower,” can therefore, encompasses both an orientation of “lower” and “upper,” depending on the particular orientation of the figure. Similarly, when the device in one of the figures is turned over, elements described as “below” or “beneath” other elements would then be oriented “above” the other elements. The exemplary terms “below” or “beneath” can, therefore, encompass both an orientation of above and below.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term “about” can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an embodiment of a display device 1000 according to the invention.

Referring to FIG. 1, the display device 1000 may include a display panel 100, a driving controller 200, a gate driver 300, a data driver 400, and an emission driver 500. In an embodiment, the driving controller 200 and the data driver 400 may be integrated into one chip.

The display panel 100 has a display region on which an image is displayed and a peripheral region adjacent to the display region. In an embodiment, the gate driver 300 may be integrated on the peripheral region of the display panel 100.

The display panel 100 may include a plurality of gate lines GWL, GIL, and GCL, a plurality of data lines DL, a plurality of emission lines EML, and a plurality of pixels P electrically connected to the data lines DL, the gate lines GWL, GIL, and GCL, and the emission lines EML. The gate lines GWL, GIL, and GCL and the emission lines EML may extend in a first direction D1 and the data lines DL may extend in a second direction D2 crossing the first direction D1. The pixel P may be the same as a pixel circuit.

The driving controller 200 may receive input image data IMG and an input control signal CONT from a host processor (e.g., a graphic processing unit (“GPU”)). In an embodiment, the input image data IMG may include red image data, green image data and blue image data, for example. In an embodiment, the input image data IMG may further include white image data. In another embodiment, the input image data IMG may include magenta image data, yellow image data, and cyan image data, for example. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, and an output image data OIMG based on the input image data IMG and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may generate the third control signal CONT3 for controlling operation of the emission driver 500 based on the input control signal CONT and output the third control signal CONT3 to the emission driver 500. The third control signal CONT3 may include a vertical start signal and a emission clock signal.

The driving controller 200 may receive the input image data IMG and the input control signal CONT, and generate the output image data OIMG. The driving controller 200 may the output image data OIMG to the data driver 400.

The gate driver 300 may generate gate signals in response to the first control signal CONT1 input from the driving controller 200. The gate driver 300 may output the gate signals to the gate lines GWL, GIL, and GCL. In an embodiment, the gate driver 300 may sequentially output the gate signals to the gate lines GWL, GIL, and GCL, for example.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL.

The emission driver 500 may generate emission signals in response to the third control signal CONT3 input from the driving controller 200. The emission driver 500 may output the emission signals to the emission lines EML. In an embodiment, the emission driver 500 may sequentially output the emission signals to the emission lines EML, for example.

In FIG. 1, for convenience of explanation, it is illustrated that the gate driver 300 is disposed on a first side (e.g., left side in FIG. 1) of the display panel 100 and the emission driver 500 is disposed on a second side (e.g., right side in FIG. 1) of the display panel 100. The invention is not limited thereto. In an embodiment, both the gate driver 300 and the emission driver 500 may be disposed on the first side of the display panel 100, for example. In an embodiment, the gate driver 300 and the emission driver 500 may be integrated in a single chip, for example.

Figure 2:
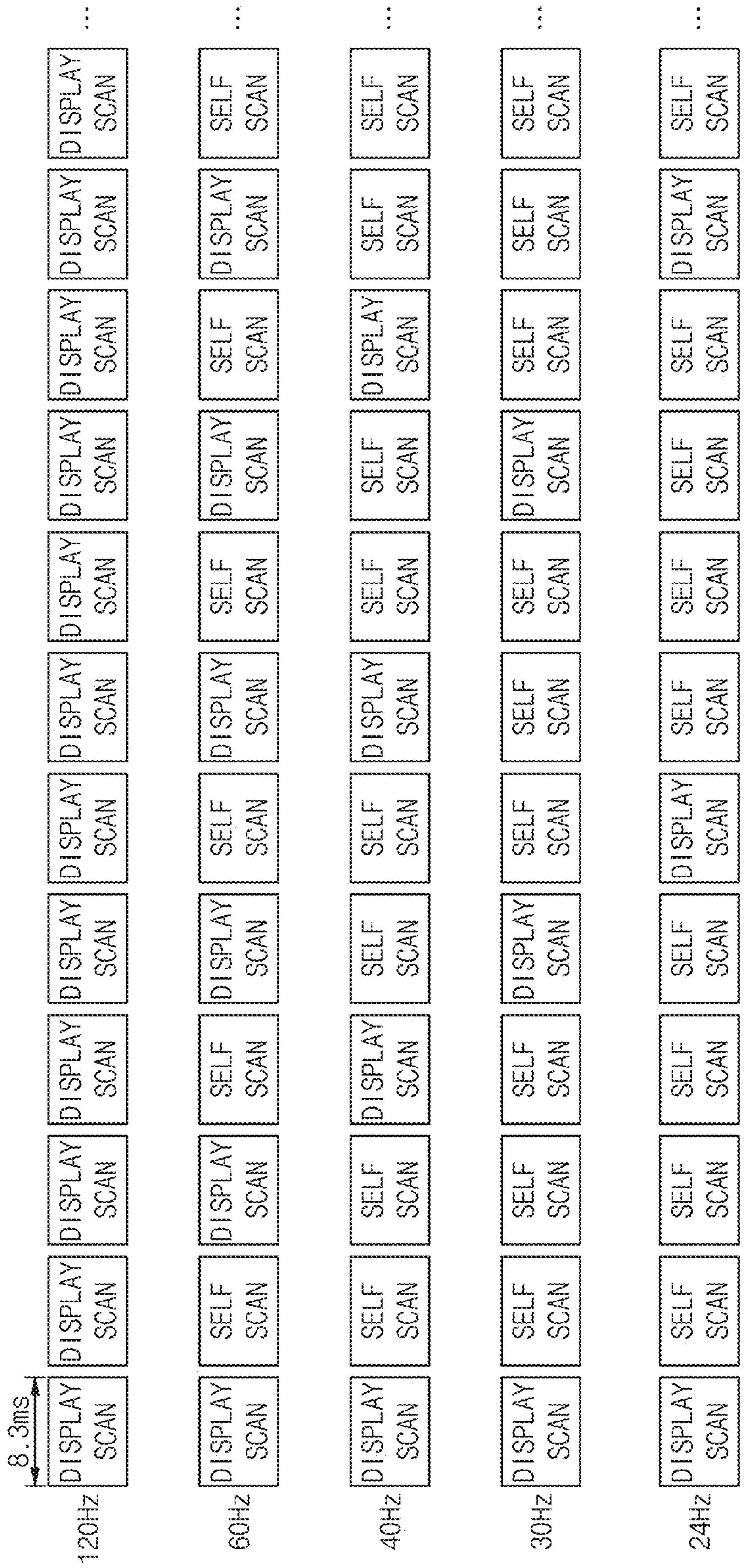
FIG. 2 is a conceptual diagram for explaining a driving operation of the display device of FIG. 1.

FIG. 2 is a conceptual diagram for explaining a driving operation of the display device 1000 of FIG. 1.

Referring to FIG. 2, the driving controller 200 may vary a driving frequency of the display panel 100 by adjusting the number of self-scan periods. The display device 1000 may write data voltages to the pixels P in a display scan period DISPLAY SCAN and perform only light emission without writing data voltages to the pixels P in the self-scan period. A detailed description thereof will be given later.

In an embodiment, it is assumed that one display scan period DISPLAY SCAN and one self-scan period SELF SCAN are about 8.3 milliseconds (ms), and the maximum driving frequency of the display panel 100 is about 120 hertz (Hz). The display device 1000 may include at least one self-scan period SELF SCAN between the display scan periods DISPLAY SCAN at driving frequencies (i.e., about 60 Hz, about 40 Hz, about 30 Hz, and about 24 Hz) except for the maximum driving frequency of the display panel 100. Specifically, when the driving frequency of the display panel 100 is about 120 Hz, the display device 1000 may not include the self-scan period SELF SCAN between the display scan periods DISPLAY SCAN. When the driving frequency of the display panel 100 is about 60 Hz, the display device 1000 may include one self-scan period SELF SCAN between the display scan periods DISPLAY SCAN. When the driving frequency of the display panel 100 is about 40 Hz, the display device 1000 may include two self-scan period SELF SCAN between the display scan periods DISPLAY SCAN. When the driving frequency of the display panel 100 is about 30 Hz, the display device 1000 may include three self-scan period SELF SCAN between the display scan periods DISPLAY SCAN. When the driving frequency of the display panel 100 is about 24 Hz, the display device 1000 may include four self-scan period SELF SCAN between the display scan periods DISPLAY SCAN. Since the data voltages is not written to the pixels P in the self-scan period, the display device 1000 may adjust the driving frequency of the display panel 100 by adjusting the number of the self-scan periods SELF SCAN. That is, since the length between the display scan periods DISPLAY SCAN in which data voltages are written increases as the number of self-scan periods SELF SCAN increases, the driving frequency of the display panel 100 may be varied.

Figure 3:
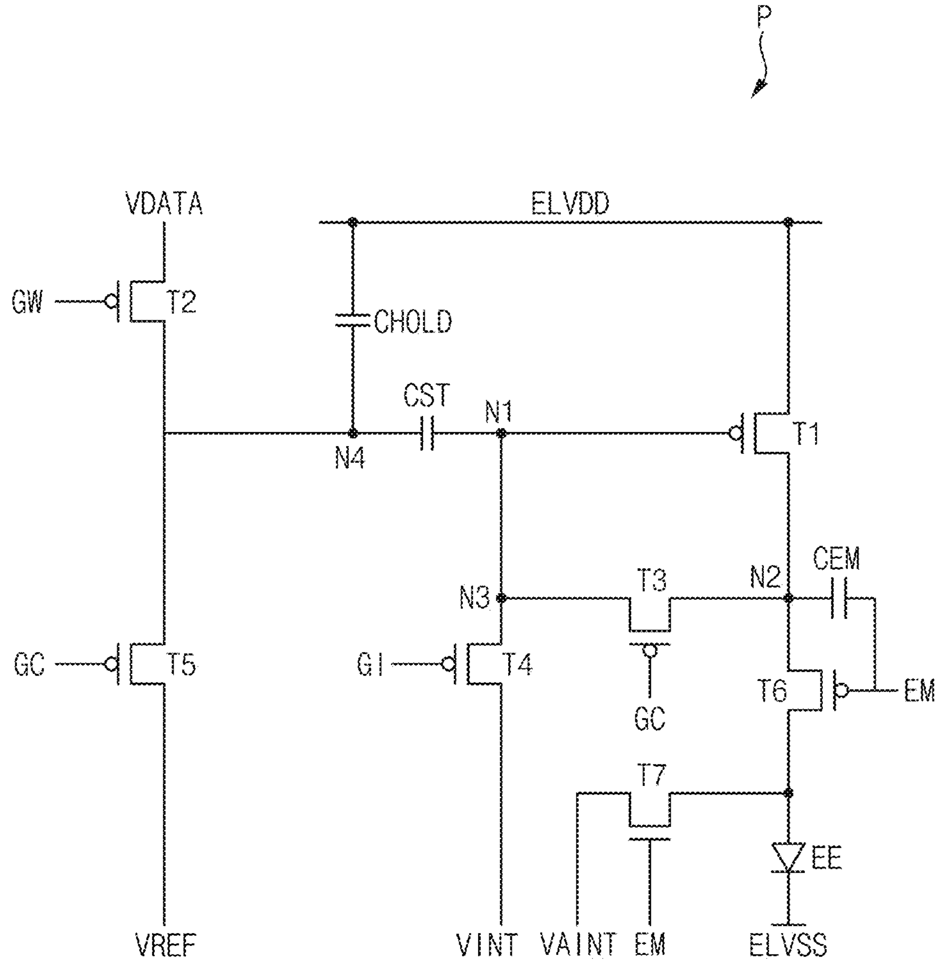
FIG. 3 is a circuit diagram illustrating an embodiment of pixels of the display device of FIG. 1.
Figure 4:
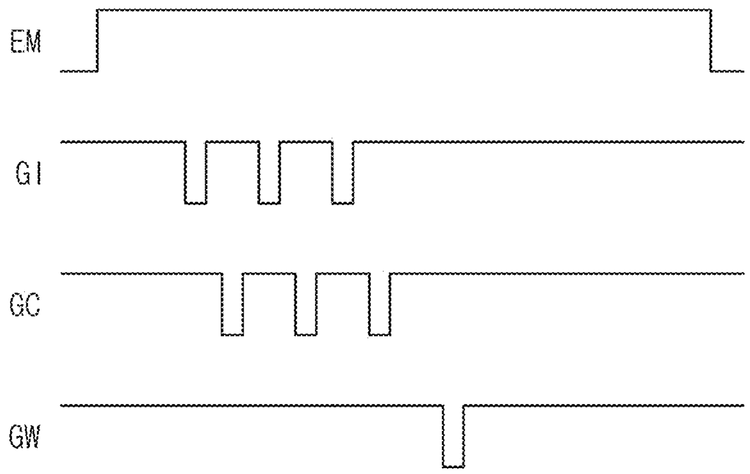
FIG. 4 is a timing diagram illustrating an embodiment of signals applied to the pixels of FIG. 3 in a display scan period.
Figure 5:
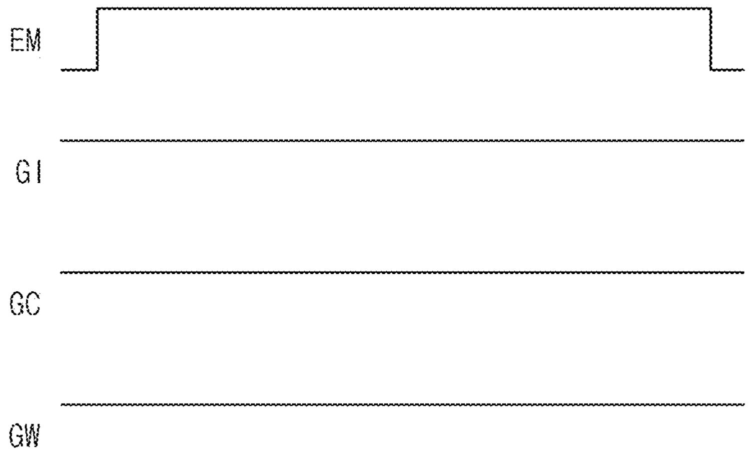
FIG. 5 is a timing diagram illustrating an embodiment of signals applied to the pixels of FIG. 3 in a self-scan period.

FIG. 3 is a circuit diagram illustrating an embodiment of the pixels P of the display device 1000 of FIG. 1, FIG. 4 is a timing diagram illustrating an embodiment of signals applied to the pixels P of FIG. 3 in the display scan period (DISPLAY SCAN in FIG. 2), and FIG. 5 is a timing diagram illustrating an embodiment of signals applied to the pixels P of FIG. 3 in the self-scan period (SELF SCAN in FIG. 2).

Referring to FIG. 3, each of the pixels P may include a light-emitting element EE, a driving transistor T1 which applies a driving current to the light-emitting element EE, a storage capacitor CST connected to a control electrode (i.e., a first node N1) of the driving transistor T1, a data voltage-applying transistor T2 which applies a data voltage VDATA to the storage capacitor CST, an emission transistor T6 which connects the driving transistor T1 to the light-emitting element EE in response to the emission signal EM, and a bias capacitor CEM disposed between a first electrode (i.e., a second node N2) of the driving transistor T1 and a control electrode of the emission transistor T6. In an embodiment, the emission transistor T6 may be a P-type transistor. In an embodiment, the driving transistor T1 and the data voltage-applying transistor T2 may be P-type transistors. In an embodiment, the driving transistor T1, the data voltage-applying transistor T2, and the emission transistor T6 may be low temperature polysilicon ("LTPS") thin film transistors ("TFTs"), for example.

Each of the pixels P may further include an light-emitting element initialization transistor T7 which applies a first initialization voltage VAINT to an anode electrode of the light-emitting element EE. Each of the pixels P may further include a data initialization transistor T4 which applies a second initialization voltage VINT to the control electrode of the driving transistor T1. In an embodiment, the first initialization voltage VAINT may be substantially the same as the second initialization voltage VINT. In another embodiment, the first initialization voltage VAINT may be different from the second initialization voltage VINT. By setting different levels of the voltage (i.e., the first initialization voltage VAINT) for initializing the anode electrode of the light-emitting element EE and the voltage (i.e., the second initialization voltage VINT) for initializing the control electrode of the driving transistor T1, initializations of the anode electrode of the light-emitting element EE and the control electrode of the driving transistor T1 may be performed more precisely. In an embodiment, the emission transistor T6 and the data initialization transistor T4 may be P-type transistors, and the light-emitting element initialization transistor T7 may be an N-type transistor. In an embodiment, the emission transistor T6 and the data initialization transistor T4 may be LTPS TFTs, and the light-emitting element initialization transistor T7 may be an oxide TFT, for example.

Each of the pixels P may further include a threshold voltage compensation transistor T3 disposed between the control electrode of the driving transistor T1 and the first electrode of the driving transistor T1. Each of the pixels P may further include a reference voltage-applying transistor T5 which applies a reference voltage VREF to the storage capacitor CST. In an embodiment, the driving transistor T1 may include a second electrode which receives a driving power voltage ELVDD, and the reference voltage VREF may be the same as the driving power voltage ELVDD. That is, the reference voltage VREF may be the same as the voltage applied to the second electrode of the driving transistor T1 (i.e., the driving power voltage ELVDD). A control signal applied to the control electrode of the reference voltage-applying transistor T5 may be the same as a control signal (i.e., a compensation gate signal GC) applied to a control electrode of the threshold voltage compensation transistor T3. In an embodiment, the threshold voltage compensation transistor T3 and the reference voltage-applying transistor T5 may be P-type transistors. In an embodiment, the threshold voltage compensation transistor T3 and the reference voltage-applying transistor T5 may be LTPS TFTs, for example.

Each of the pixels P may further include a hold capacitor CHOLD including a first electrode which receives the driving power voltage ELVDD and a second electrode connected to the first electrode (i.e., a fourth node N4) of the storage capacitor CST.

In detail with respect to the pixels P, each of the pixels P may include the driving transistor T1 including the control electrode connected to the first node N1, the second electrode which receives the driving power voltage ELVDD, and the first electrode connected to the second node N2, the data voltage-applying transistor T2 including a control electrode which receives a data writing gate signal GW, a second electrode which receives the data voltage VDATA, and a first electrode connected to the fourth node N4, the threshold voltage compensation transistor T3 including a control electrode which receives the compensation gate signal GC, a second electrode connected to the second node N2, and a first electrode connected to the third node N3, the data initialization transistor T4 including a control electrode which receives a data initialization gate signal GI, a second electrode which receives the second initialization voltage VINT, and a first electrode connected to the third node N3 (The third node N3 is the same as the first node N1), the reference voltage-applying transistor T5 including a control electrode which receives the compensation gate signal GC, a second electrode which receives the reference voltage VREF, a first electrode connected to the fourth node N4, the emission transistor T6 including a control electrode which receives the emission signal EM, a second electrode connected to the second node N2, and a first node connected to the anode electrode of the light-emitting element EE, the light-emitting element initialization transistor T7 including a control electrode which receives the emission signal EM, a second electrode which receives the first initialization voltage VAINT, and a first electrode connected to the anode electrode of the light-emitting element EE, the storage capacitor CST including a first electrode connected to the fourth node N4 and a second node connected to the first node N1, the hold capacitor CHOLD including a first electrode which receives the driving power voltage ELVDD and a second electrode connected to the fourth node N4, the bias capacitor CEM including a first electrode connected to the control electrode of the emission transistor T6 and a second electrode connected to the second node N2, and the light-emitting element EE including a anode electrode connected to the first electrode of the emission transistor T6 and a cathode electrode which receives a ground power voltage ELVSS. The driving transistor T1, the data voltage-applying transistor T2, the threshold voltage compensation transistor T3, the data initialization transistor T4, the reference voltage-applying transistor T5, and the emission transistor T6 are P-type transistors, and the light-emitting element initialization transistor T7 is an N-type transistor in FIG. 3, but the invention is not limited thereto.

Referring to FIGS. 3 to 5, since the emission transistor T6 is turned off in a period in which the emission signal EM has a high voltage level, the light-emitting element EE may not emit light. When the emission signal EM varies to a low voltage level, the emission transistor T6 may be turned on and the light-emitting element EE may emit light.

The data initialization gate signal GI may be applied to the control electrode of the data initialization transistor T4. When the data initialization gate signal GI has the low voltage level, the data initialization transistor T4 may be turned on and the second initialization voltage VINT may be applied to the control electrode of the driving transistor T1 through the data initialization transistor T4.

The emission signal EM may be applied to the control electrode of the light-emitting element initialization transistor T7. When the emission signal EM has the high voltage level, the light-emitting element initialization transistor T7 may be turned on and the first initialization voltage VAINT may be applied to the anode electrode of the light-emitting element EE through the light-emitting element initialization transistor T7.

The compensation gate signal GC may be applied to the control electrode of the threshold voltage compensation transistor T3 and the control electrode of the reference voltage-applying transistor T5. When the compensation gate signal GC has the low voltage level, the threshold voltage compensation transistor T3 may be turned on and a threshold voltage of the driving transistor T1 may be compensated through the threshold voltage compensation transistor T3. When the compensation gate signal GC has the low voltage level, the reference voltage-applying transistor T5 may be turned on and the reference voltage VREF may be applied to the fourth node N4 through the reference voltage-applying transistor T5.

The data writing gate signal GW may be applied to the control electrode of the data voltage-applying transistor T2. When the data writing gate signal GW has the low voltage level, the data voltage-applying transistor T2 may be turned on and the data voltage VDATA may be applied to the fourth node N4 through the data voltage-applying transistor T2.

Referring to FIGS. 2 to 4, in the display scan period, after a light-emitting element initialization operation (i.e., an operation of applying the first initialization voltage VAINT to the anode electrode of the light-emitting element EE), a data initialization operation (i.e., an operation of applying the second initialization voltage VINT to the control electrode of the driving transistor T1), and a threshold voltage compensation operation (i.e., an operation of applying a voltage for which the threshold voltage is compensated to the control electrode of the driving transistor T1) are performed, a data writing operation (i.e., an operation of applying the data voltage VDATA to the fourth node N4) may be performed. After the data writing operation is performed, the emission transistor T6 may be turned on and the light-emitting element EE may emit light.

Since the data initialization gate signal GI and the compensation gate signal GC have three low pulses, the data initialization operation, the light-emitting element initialization operation, and the threshold voltage compensation operation may be performed three times. In FIG. 4, the data initialization gate signal GI and the compensation gate signal GC are illustrated as having three low pulses, but the invention is not limited thereto.

Referring to FIGS. 2, 3, and 5, in the self-scan period, the data initialization gate signal GI, the compensation gate signal GC, and the data writing gate signal GW may have the high voltage level. Accordingly, the data writing operation may not be performed in the self-scan period. That is, in the self-scan period, the display device 1000 may perform only light emission of the pixels P without writing the data voltage VDATA.

When the emission signal EM rises from the low voltage level to the high voltage level, the data initialization gate signal GI, the compensation gate signal GC, and the data writing gate signal GW may have the high voltage level. That is, when the emission signal EM rises from the low voltage level to the high voltage level, the second node N2 may vary a floating state, and a voltage of the second node N2 (i.e., the second electrode of the bias capacitor CEM) may also increase by rising the emission signal EM. As a result, a bias operation may be performed on the first electrode of the driving transistor T1, a hysteresis characteristic of the driving transistor T1 may be changed due to the bias operation, and a change in luminance caused by the hysteresis characteristic may be prevented (e.g., preventing a flicker on the display panel 100).

Figure 6:
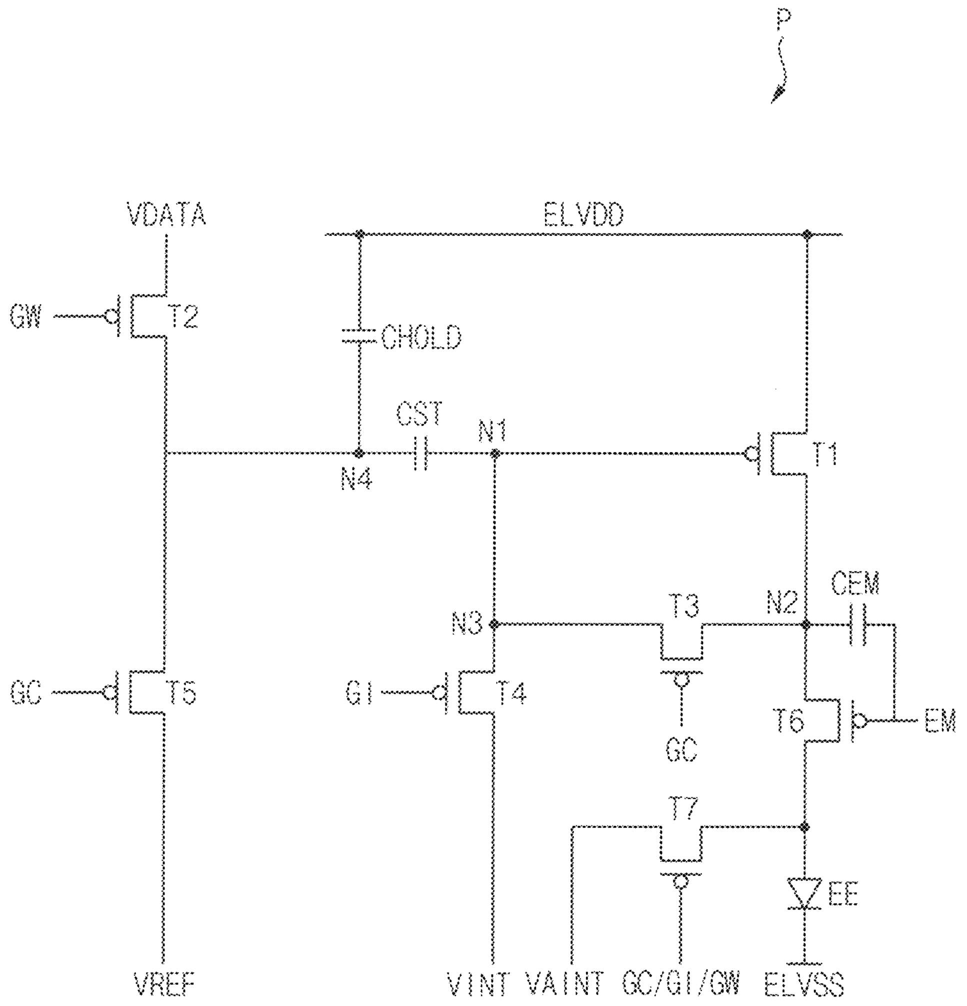
FIG. 6 is a circuit diagram illustrating an embodiment of pixels of the display device of FIG. 1.

FIG. 6 is a circuit diagram illustrating an embodiment of pixels P of the display device 1000 of FIG. 1. The pixels P of FIG. 6 is substantially the same as the pixels P of FIG. 3 except for the light-emitting element initialization transistor T7. Thus, any repetitive explanation will be omitted.

Referring to FIG. 6, each of the pixels P may further include a light-emitting element initialization transistor T7 which applies the first initialization voltage VAINT to the anode electrode of the light-emitting element EE.

In an embodiment, each of the pixels may P further include the light-emitting element initialization transistor T7 which applies the first initialization voltage VAINT to the anode electrode of the light-emitting element EE in response to the data writing gate signal GW, for example. In this case, the data voltage-applying transistor T2 and the light-emitting element initialization transistor T7 may be P-type transistors.

In an embodiment, each of the pixels P may further include the light-emitting element initialization transistor T7 configure to apply the first initialization voltage VAINT to the anode electrode of the light-emitting element EE in response to the compensation gate signal GC, for example. In this case, the threshold voltage compensation transistor T3, the reference voltage-applying transistor T5, and the light-emitting element initialization transistor T7 may be P-type transistors.

In an embodiment, each of the pixels P may further include the light-emitting element initialization transistor T7 which applies the first initialization voltage VAINT to the anode electrode of the light-emitting element EE in response to the data initialization gate signal GI, for example. In an embodiment, the emission transistor T6 may be a P-type transistor, and the data initialization transistor T4 and the light-emitting element initialization transistor T7 may be P-type transistors.

In FIG. 6, the driving transistor T1, the data voltage-applying transistor T2, the threshold voltage compensation transistor T3, the data initialization transistor T4, the reference voltage-applying transistor T5, the emission transistor T6, and the light-emitting element initialization transistor T7 are illustrated as P-type transistors, but the invention is not limited thereto.

Figure 7:
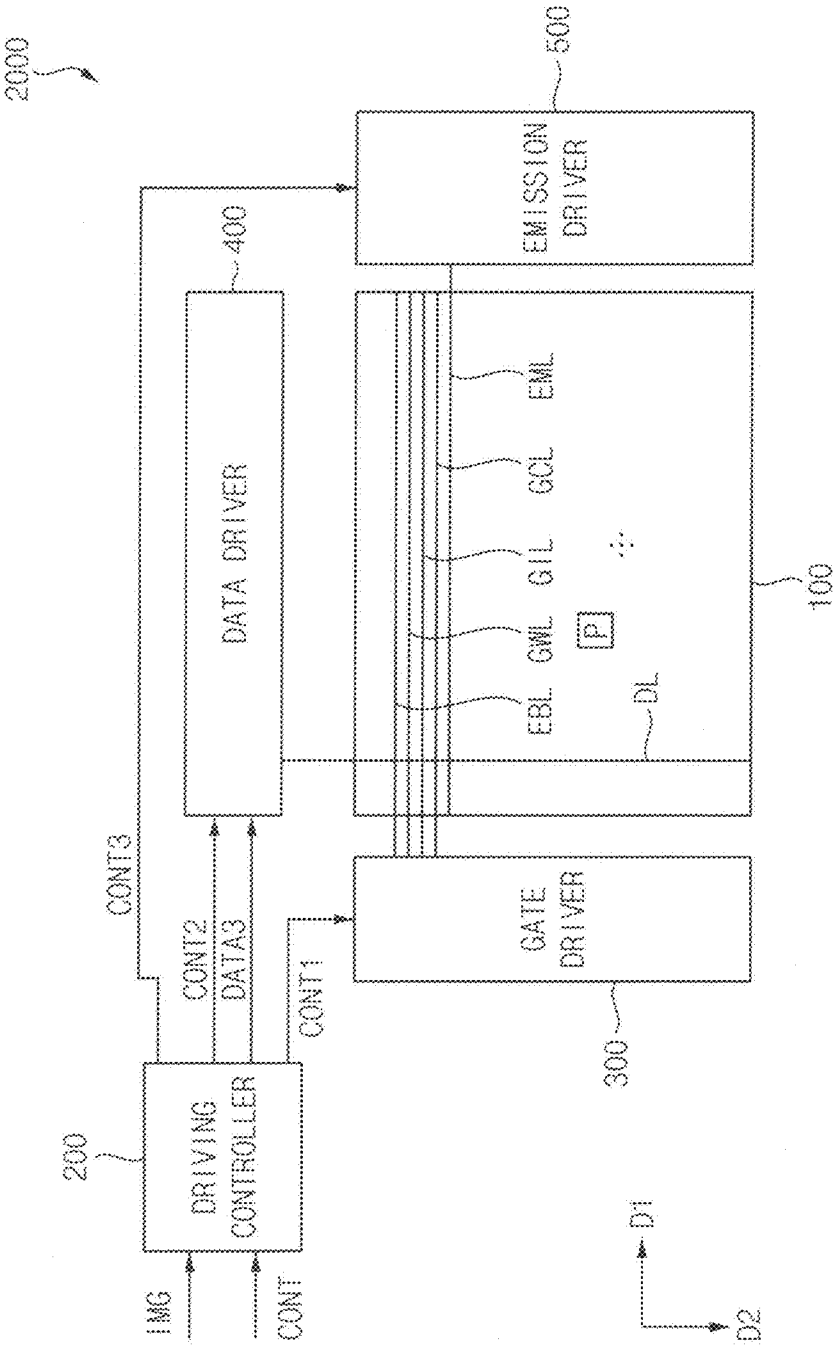
FIG. 7 is a block diagram illustrating an embodiment of a display device according to the invention.
Figure 8:
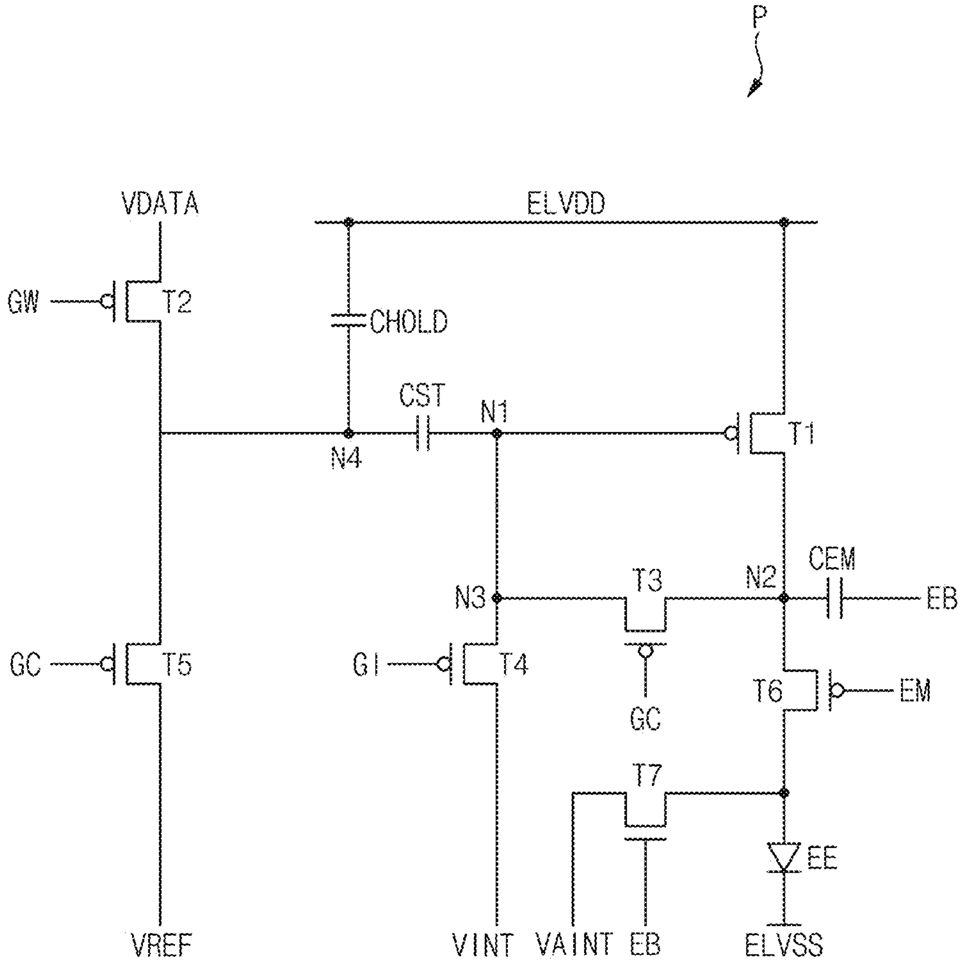
FIG. 8 is a circuit diagram illustrating an embodiment of pixels of the display device of FIG. 7.
Figure 9:
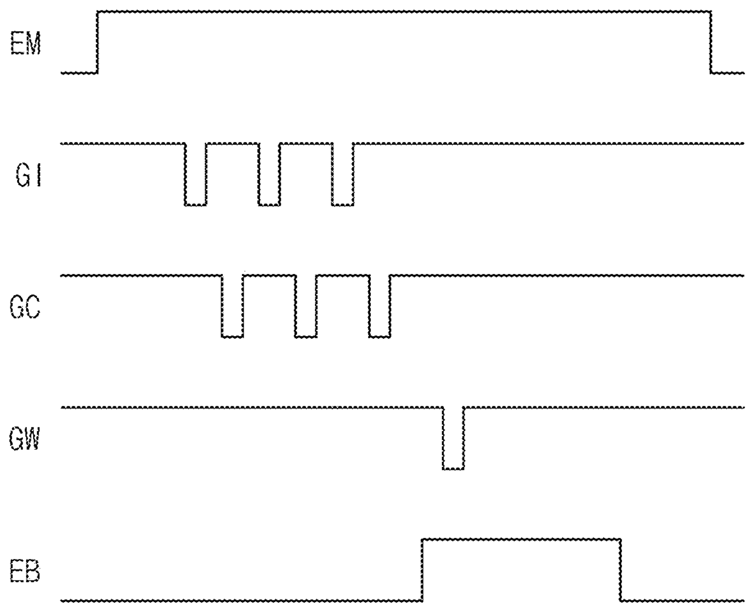
FIG. 9 is a timing diagram illustrating an embodiment of signals applied to the pixels of FIG. 8 in a display scan period.
Figure 10:
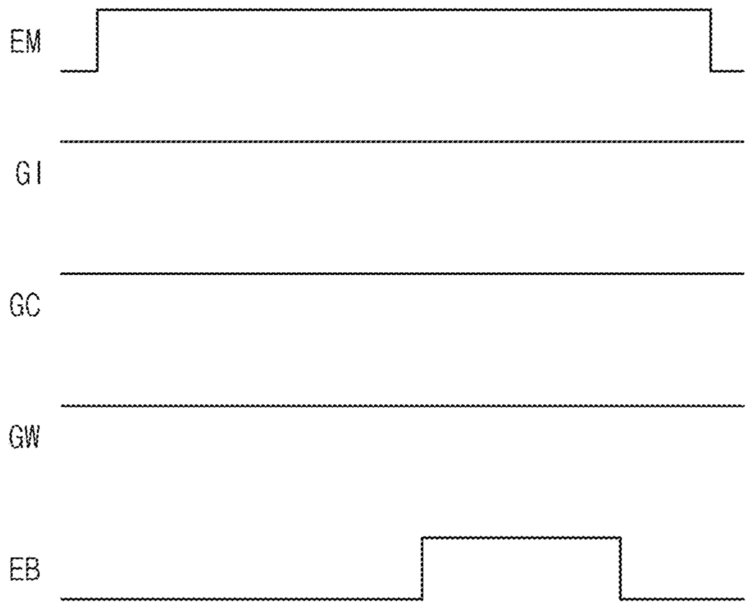
FIG. 10 is a timing diagram illustrating an embodiment of signals applied to the pixels of FIG. 8 in a self-scan period.

FIG. 7 is a block diagram illustrating an embodiment of a display device 2000 according to the invention, FIG. 8 is a circuit diagram illustrating an embodiment of pixels P of the display device 2000 of FIG. 7, FIG. 9 is a timing diagram illustrating an embodiment of signals applied to the pixels P of FIG. 8 in the display scan period, and FIG. 10 is a timing diagram illustrating an embodiment of signals applied to the pixels P of FIG. 8 in the self-scan period.

The display device (or display apparatus) 2000 in the illustrated embodiment is substantially the same as the display device (or display apparatus) 1000 of FIG. 1 except for the pixels P and the gate lines EBL, GWL, GIL, and GCL. Thus, the same reference numerals are used to refer to the same or similar element, and any repetitive explanation will be omitted.

Referring to FIG. 7, the display panel 100 may include a plurality of gate lines EBL, GWL, GIL, and GCL, a plurality of data lines DL, a plurality of emission lines EML, and a plurality of the pixels P electrically connected to the data lines DL, the gate lines EBL, GWL, GIL, and GCL, and the emission lines EML. The gate lines EBL, GWL, GIL, and GCL and the emission lines EML may extend in a first direction D1 and the data lines DL may extend in a second direction D2 crossing the first direction D1.

The gate driver 300 may generate gate signals in response to the first control signal CONT1 input from the driving controller 200. The gate driver 300 may output the gate signals to the gate lines EBL, GWL, GIL, and GCL. In an embodiment, the gate driver 300 may sequentially output the gate signals to the gate lines EBL, GWL, GIL, and GCL, for example.

In FIG. 7, for convenience of explanation, it is illustrated that the gate driver 300 is disposed on a first side (e.g., left side in FIG. 7) of the display panel 100 and the emission driver 500 is disposed on a second side (e.g., right side in FIG. 7) of the display panel 100. The invention is not limited thereto. In an embodiment, both the gate driver 300 and the emission driver 500 may be disposed on the first side of the display panel 100, for example. In an embodiment, the gate driver 300 and the emission driver 500 may be integrated in a single chip.

Referring to FIG. 8, each of the pixels P may include a light-emitting element EE, a driving transistor T1 which applies a driving current to the light-emitting element EE, a storage capacitor CST connected to a control electrode (i.e., a first node N1) of the driving transistor T1, a data voltage-applying transistor T2 which applies a data voltage VDATA to the storage capacitor CST, an emission transistor T6 which connects the driving transistor T1 to the light-emitting element EE in response to the emission signal EM, and a bias capacitor CEM including a first electrode which receives a bias signal EB and a second electrode connected to the first electrode of the driving transistor T1. In an embodiment, the driving transistor T1, the data voltage-applying transistor T2, and the emission transistor T6 may be P-type transistors. In an embodiment, the driving transistor T1, the data voltage-applying transistor T2, and the emission transistor T6 may be LTPS TFTs, for example.

Each of the pixels P may further include an light-emitting element initialization transistor T7 which applies a first initialization voltage VAINT to an anode electrode of the light-emitting element EE. Each of the pixels P may further include a data initialization transistor T4 which applies a second initialization voltage VINT to the control electrode of the driving transistor T1. In an embodiment, the first initialization voltage VAINT may be substantially the same as the second initialization voltage VINT. In another embodiment, the first initialization voltage VAINT may be different from the second initialization voltage VINT. By setting different levels of the voltage (i.e., the first initialization voltage VAINT) for initializing the anode electrode of the light-emitting element EE and the voltage (i.e., the second initialization voltage VINT) for initializing the control electrode of the driving transistor T1, initializations of the anode electrode of the light-emitting element EE and the control electrode of the driving transistor T1 may be performed more precisely. In an embodiment, the emission transistor T6 and the data initialization transistor T4 may be P-type transistors, and the light-emitting element initialization transistor T7 may be an N-type transistor. In an embodiment, the emission transistor T6 and the data initialization transistor T4 may be LTPS TFTs, and the light-emitting element initialization transistor T7 may be an oxide TFT, for example.

Each of the pixels P may further include a threshold voltage compensation transistor T3 disposed between the control electrode of the driving transistor T1 and the first electrode of the driving transistor T1. Each of the pixels P may further include a reference voltage-applying transistor T5 which applies a reference voltage VREF to the storage capacitor CST. In an embodiment, the driving transistor T1 may include a second electrode which receives a driving power voltage ELVDD, and the reference voltage VREF may be the same as the driving power voltage ELVDD. That is, the reference voltage VREF may be the same as the voltage applied to the second electrode of the driving transistor T1 (i.e., the driving power voltage ELVDD). A control signal applied to the control electrode of the reference voltage-applying transistor T5 may be the same as a control signal (i.e., a compensation gate signal GC) applied to a control electrode of the threshold voltage compensation transistor T3. In an embodiment, the threshold voltage compensation transistor T3 and the reference voltage-applying transistor T5 may be P-type transistors. In an embodiment, the threshold voltage compensation transistor T3 and the reference voltage-applying transistor T5 may be LTPS TFTs, for example.

Each of the pixels P may further include a hold capacitor CHOLD including a first electrode which receives the driving power voltage ELVDD and a second electrode connected to the first electrode (i.e., a fourth node N4) of the storage capacitor CST.

In detail with respect to the pixels P, each of the pixels P may include the driving transistor T1 including the control electrode connected to the first node N1, the second electrode which receives the driving power voltage ELVDD, and the first electrode connected to the second node N2, the data voltage-applying transistor T2 including a control electrode which receives a data writing gate signal GW, a second electrode which receives the data voltage VDATA, and a first electrode connected to the fourth node N4, the threshold voltage compensation transistor T3 including a control electrode which receives the compensation gate signal GC, a second electrode connected to the second node N2, and a first electrode connected to the third node N3, the data initialization transistor T4 including a control electrode which receives a data initialization gate signal GI, a second electrode which receives the second initialization voltage VINT, and a first electrode connected to the third node N3 (The third node N3 is the same as the first node N1), the reference voltage-applying transistor T5 including a control electrode which receives the compensation gate signal GC, a second electrode which receives the reference voltage VREF, a first electrode connected to the fourth node N4, the emission transistor T6 including a control electrode which receives the emission signal EM, a second electrode connected to the second node N2, and a first node connected to the anode electrode of the light-emitting element EE, the light-emitting element initialization transistor T7 including a control electrode which receives the bias signal EB, a second electrode which receives the first initialization voltage VAINT, and a first electrode connected to the anode electrode of the light-emitting element EE, the storage capacitor CST including a first electrode connected to the fourth node N4 and a second node connected to the first node N1, the hold capacitor CHOLD including a first electrode which receives the driving power voltage ELVDD and a second electrode connected to the fourth node N4, the bias capacitor CEM including a first electrode which receives the bias signal EB and a second electrode connected to the second node N2, and the light-emitting element EE including a anode electrode connected to the first electrode of the emission transistor T6 and a cathode electrode which receives a ground power voltage ELVSS. The driving transistor T1, the data voltage-applying transistor T2, the threshold voltage compensation transistor T3, the data initialization transistor T4, the reference voltage-applying transistor T5, and the emission transistor T6 are P-type transistors, and the light-emitting element initialization transistor T7 is an N-type transistor in FIG. 8, but the invention is not limited thereto.

Referring to FIGS. 8 to 10, since the emission transistor T6 is turned off in a period in which the emission signal EM has the high voltage level, the light-emitting element EE may not emit light. When the emission signal EM varies to the low voltage level, the emission transistor T6 may be turned on and the light-emitting element EE may emit light.

The data initialization gate signal GI may be applied to the control electrode of the data initialization transistor T4. When the data initialization gate signal GI has the low voltage level, the data initialization transistor T4 may be turned on and the second initialization voltage VINT may be applied to the control electrode of the driving transistor T1 through the data initialization transistor T4.

The bias signal EB may be applied to the control electrode of the light-emitting element initialization transistor T7. When the bias signal EB has the high voltage level, the light-emitting element initialization transistor T7 may be turned on and the first initialization voltage VAINT may be applied to the anode electrode of the light-emitting element EE through the light-emitting element initialization transistor T7.

The compensation gate signal GC may be applied to the control electrode of the threshold voltage compensation transistor T3 and the control electrode of the reference voltage-applying transistor T5. When the compensation gate signal GC has the low voltage level, the threshold voltage compensation transistor T3 may be turned on and the threshold voltage of the driving transistor T1 may be compensated through the threshold voltage compensation transistor T3. When the compensation gate signal GC has the low voltage level, the reference voltage-applying transistor T5 may be turned on and the reference voltage VREF may be applied to the fourth node N4 through the reference voltage-applying transistor T5.

The data writing gate signal GW may be applied to the control electrode of the data voltage-applying transistor T2. When the data writing gate signal GW has the low voltage level, the data voltage-applying transistor T2 may be turned on and the data voltage VDATA may be applied to the fourth node N4 through the data voltage-applying transistor T2.

Referring to FIGS. 2, 8, and 9, in the display scan period, after the light-emitting element initialization operation (i.e., an operation of applying the first initialization voltage VAINT to the anode electrode of the light-emitting element EE), the data initialization operation (i.e., an operation of applying the second initialization voltage VINT to the control electrode of the driving transistor T1), and the threshold voltage compensation operation (i.e., an operation of applying a voltage for which the threshold voltage is compensated to the control electrode of the driving transistor T1) are performed, the data writing operation (i.e., an operation of applying the data voltage VDATA to the fourth node N4) may be performed. After the data writing operation is performed, the emission transistor T6 may be turned on and the light-emitting element EE may emit light.

Since the data initialization gate signal GI and the compensation gate signal GC have three low pulses, the data initialization operation, the light-emitting element initialization operation, and the threshold voltage compensation operation may be performed three times. In FIG. 9, the data initialization gate signal GI and the compensation gate signal GC are illustrated as having three low pulses, but the invention is not limited thereto.

Referring to FIGS. 2, 8, and 10, in the self-scan period, the data initialization gate signal GI, the compensation gate signal GC, and the data writing gate signal GW may have the high voltage level. Accordingly, the data writing operation may not be performed in the self-scan period. That is, in the self-scan period, the display device 1000 may perform only light emission of the pixels P without writing the data voltage VDATA.

When the emission signal EM has the high voltage level, the bias signal EB may rise from the low voltage level to the high voltage level. When the bias signal EB may rise from the low voltage level to the high voltage level, the emission signal EM, the data initialization gate signal GI, the compensation gate signal GC, and the data writing gate signal GW may have the high voltage level. That is, when the bias signal EB rises from the low voltage level to the high voltage level, the second node N2 may vary a floating state, and a voltage of the second node N2 (i.e., the second electrode of the bias capacitor CEM) may also increase by rising the bias signal EB. As a result, the bias operation may be performed on the first electrode of the driving transistor T1, the hysteresis characteristic of the driving transistor T1 may be changed due to the bias operation, and a change in luminance caused by the hysteresis characteristic may be prevented (e.g., preventing a flicker on the display panel 100).

Figure 11:
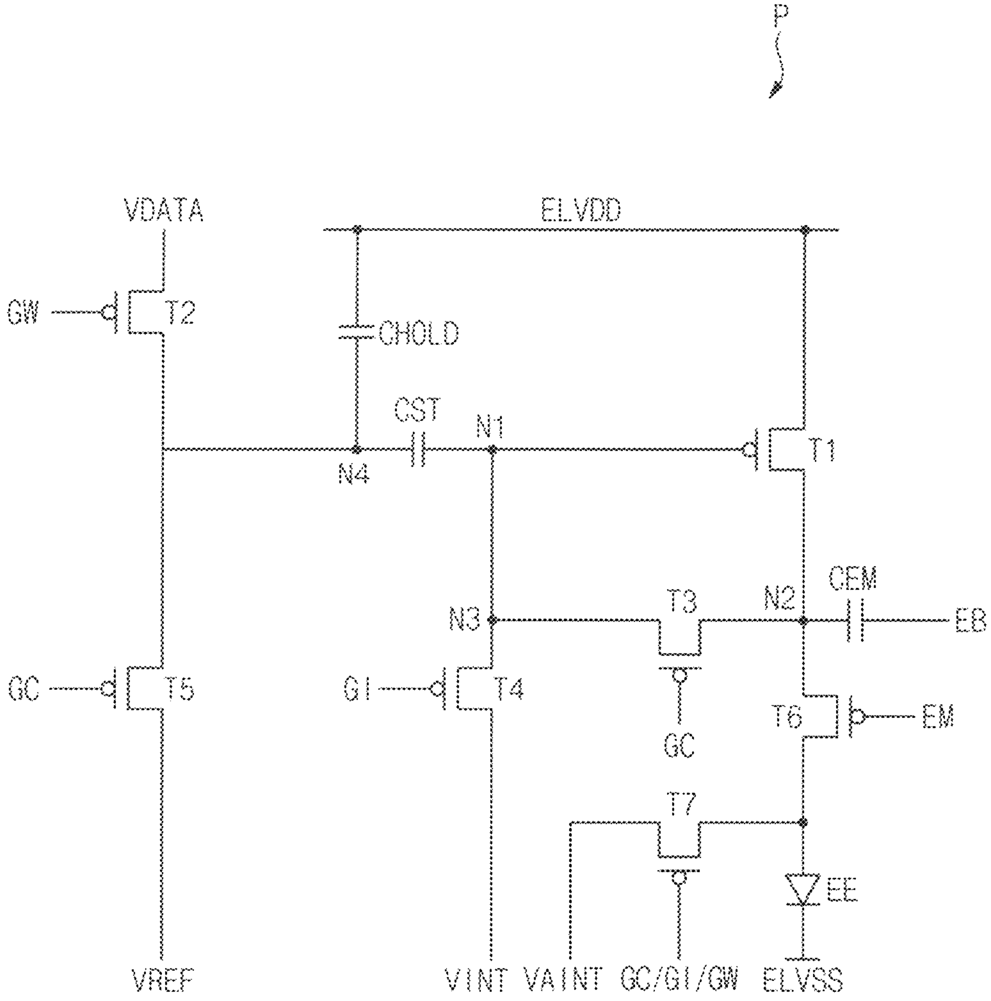
FIG. 11 is a circuit diagram illustrating an embodiment of pixels of the display device of FIG. 7.

FIG. 11 is a circuit diagram illustrating an embodiment of the pixels P of the display device 2000 of FIG. 7. The pixels P of FIG. 11 is substantially the same as the pixels P of FIG. 8 except for the light-emitting element initialization transistor T7. Thus, any repetitive explanation will be omitted.

Referring to FIG. 11, each of the pixels P may further include a light-emitting element initialization transistor T7 which applies the first initialization voltage VAINT to the anode electrode of the light-emitting element EE.

In an embodiment, each of the pixels P may further include the light-emitting element initialization transistor T7 which applies the first initialization voltage VAINT to the anode electrode of the light-emitting element EE in response to the data writing gate signal GW, for example. In this case, the data voltage-applying transistor T2 and the light-emitting element initialization transistor T7 may be P-type transistors.

In an embodiment, each of the pixels P may further include the light-emitting element initialization transistor T7 which applies the first initialization voltage VAINT to the anode electrode of the light-emitting element EE in response to the compensation gate signal GC, for example. In this case, the threshold voltage compensation transistor T3, the reference voltage-applying transistor T5, and the light-emitting element initialization transistor T7 may be P-type transistors.

In an embodiment, each of the pixels P may further include the light-emitting element initialization transistor T7 which applies the first initialization voltage VAINT to the anode electrode of the light-emitting element EE in response to the data initialization gate signal GI, for example. In an embodiment, the emission transistor T6 may be a P-type transistor, and the data initialization transistor T4 and the light-emitting element initialization transistor T7 may be P-type transistors.

In FIG. 11, the driving transistor T1, the data voltage-applying transistor T2, the threshold voltage compensation transistor T3, the data initialization transistor T4, the reference voltage-applying transistor T5, the emission transistor T6, and the light-emitting element initialization transistor T7 are illustrated as P-type transistors, but the invention is not limited thereto.

Embodiments of the inventions may be applied to any electronic device including the display device. Embodiments of the invention may be applied to a television ("TV"), a digital TV, a three dimensional ("3D") TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc., for example.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the illustrative embodiments disclosed, and that modifications to the disclosed embodiments, as well as other embodiments, are intended to be included within the scope of the appended claims.

What is claimed is:

1. A pixel circuit comprising:

a light-emitting element;

a driving transistor which applies a driving current to the light-emitting element and includes a control electrode and a first electrode;

a storage capacitor connected to the control electrode of the driving transistor;

a data voltage-applying transistor which is directly connected to the storage capacitor and directly applies a data voltage to the storage capacitor;

an emission transistor which connects the driving transistor to the light-emitting element in response to an emission signal and includes a control electrode; and a bias capacitor disposed between the first electrode of the driving transistor and the control electrode of the emission transistor.

2. The pixel circuit of claim 1, wherein the emission transistor is a P-type transistor.

3. The pixel circuit of claim 1, wherein the light-emitting element includes an anode electrode, and wherein the pixel circuit further comprises a light-emitting element initialization transistor which applies a first initialization voltage to the anode electrode of the light-emitting element.

4. The pixel circuit of claim 3, wherein the light-emitting element initialization transistor applies the first initialization voltage to the anode electrode of the light-emitting element in response to the emission signal, wherein the light-emitting element initialization transistor is an N-type transistor, and wherein the emission transistor is a P-type transistor.

5. The pixel circuit of claim 1, further comprising a data initialization transistor which applies a second initialization voltage to the control electrode of the driving transistor.

6. The pixel circuit of claim 1, further comprising a threshold voltage compensation transistor disposed between the control electrode of the driving transistor and the first electrode of the driving transistor.

7. The pixel circuit of claim 1, further comprising a reference voltage-applying transistor which applies a reference voltage to the storage capacitor.

8. The pixel circuit of claim 7, wherein the driving transistor further includes a second electrode which receives a driving power voltage, and wherein the reference voltage is identical to the driving power voltage.

9. The pixel circuit of claim 7, further comprising a threshold voltage compensation transistor disposed between the control electrode of the driving transistor and the first electrode of the driving transistor, and wherein a control signal applied to a control electrode of the reference voltage-applying transistor is identical to a control signal applied to a control electrode of the threshold voltage compensation transistor.

10. A pixel circuit comprising:

a light-emitting element;

a driving transistor which applies a driving current to the light-emitting element and includes a control electrode and a first electrode;

a storage capacitor connected to the control electrode of the driving transistor;

a data voltage-applying transistor which is directly connected to the storage capacitor and directly applies a data voltage to the storage capacitor;

an emission transistor which connects the driving transistor to the light-emitting element in response to an emission signal; and a bias capacitor including a first electrode which receives a bias signal and a second electrode connected to the first electrode of the driving transistor.

11. The pixel circuit of claim 10, wherein the emission transistor is a P-type transistor.

12. The pixel circuit of claim 11, wherein the bias signal rises from a low voltage level to a high voltage level while the emission signal has the high voltage level.

13. The pixel circuit of claim 10, further comprising a light-emitting element initialization transistor which applies a first initialization voltage to an anode electrode of the light-emitting element.

14. The pixel circuit of claim 13, wherein the light-emitting element initialization transistor applies the first initialization voltage to the anode electrode of the light-emitting element in response to the bias signal, wherein the light-emitting element initialization transistor is an N-type transistor, and wherein the emission transistor is a P-type transistor.

15. The pixel circuit of claim 10, further comprising a data initialization transistor which applies a second initialization voltage to the control electrode of the driving transistor.

16. The pixel circuit of claim 10, further comprising a threshold voltage compensation transistor disposed between the control electrode of the driving transistor and the first electrode of the driving transistor.

17. The pixel circuit of claim 10, further comprising a reference voltage-applying transistor which applies a reference voltage to the storage capacitor.

18. The pixel circuit of claim 17, wherein the driving transistor further includes a second electrode which receives a driving power voltage, and wherein the reference voltage is identical to the driving power voltage.

19. The pixel circuit of claim 17, wherein the reference voltage-applying transistor comprises a control electrode, wherein the pixel circuit further comprises a threshold voltage compensation transistor disposed between the control electrode of the driving transistor and the first electrode of the driving transistor, and wherein a control signal applied to the control electrode of the reference voltage-applying transistor is identical to a control signal applied to a control electrode of the threshold voltage compensation transistor.

20. A display device comprising:

a display panel including pixels, each of the pixels comprising:

a light-emitting element;

a driving transistor which applies a driving current to the light-emitting element and includes a control electrode and a first electrode;

a storage capacitor connected to the control electrode of the driving transistor;

a data voltage-applying transistor which directly connected to the storage capacitor and directly applies a data voltage to the storage capacitor;

an emission transistor which connects the driving transistor to the light-emitting element in response to an emission signal; and a bias capacitor connected to the first electrode of the driving transistor;

a gate driver which provides a gate signal to the pixels;

a data driver which provides the data voltage to the pixels;

an emission driver which provides the emission signal to the pixels; and a driving controller which controls the gate driver, the data driver, and the emission driver.

21. The display device of claim 20, wherein the bias capacitor includes a first electrode connected to a control electrode of the emission transistor and a second electrode connected to the first electrode of the driving transistor.

22. The display device of claim 20, wherein the bias capacitor includes a first electrode which receives a bias signal and a second electrode connected to the first electrode of the driving transistor.

* * * * *